(No Model.)

W. C. AGNEW.
COMBINED HORSE COLLAR AND HAME.

No. 331,750. Patented Dec. 8, 1885.

WITNESSES

INVENTOR
William C. Agnew
by R. G. Dyrenforth,
his Attorney

UNITED STATES PATENT OFFICE.

WILLIAM C. AGNEW, OF CRESTON, ILLINOIS, ASSIGNOR OF ONE-HALF TO WM. F. HOLLAND, OF SAME PLACE.

COMBINED HORSE-COLLAR AND HAME.

SPECIFICATION forming part of Letters Patent No. 331,750, dated December 8, 1885.

Application filed June 5, 1885. Serial No. 167,760. (No model.)

*To all whom it may concern:*

Be it known that I, WILLIAM C. AGNEW, a citizen of the United States, residing at Creston, in the county of Ogle and State of Illinois, have invented certain new and useful Improvements in Combined Horse-Collar and Hame, of which the following is a specification, reference being had therein to the accompanying drawings.

My invention relates to combined horse-collars and hames. The object is to be able readily to adapt a hame attachment to collars, and produce a ready, convenient, and efficient combined horse-collar and hames to be applied and removed together, and this with a collar which may readily be adjusted to a horse's neck of any size, and which will bring the whole strain of a pull upon that portion of the shoulders of the animal upon which it is advantageous to concentrate the strain, without any movement with the other side, upon the top of the horse's neck as a pivot, tending to chafe the same, and without pressure upon the windpipe, this being left uncovered and free.

The invention consists in a metallic hame-crease constructed, as described, with curved portion and tongues.

The invention further consists in the combination, with a hame crease or shell, of metal or other suitable material, constructed, as described, with curved portion and tongues, of screw-bolts or rivets.

The invention consists, further, in the combination, with a collar, of a hame crease or shell, of metal or other suitable material, capable of receiving a wooden hame to be fixed therein, whereby a hame attachment is adapted to be fixed to any suitable collar.

The invention consists, further, in the combination, with a horse-collar made in two sections, of the described hame attachment.

The invention consists, further, of a collar made in two sections adjustably connected at top and bottom by straps or the like, in combination with the hame-crease described, applied between the fore and after wales.

The invention consists, finally, of the combination, with a collar made in two sections adjustably connected at top and bottom, and having a neck pad or guard at the top, of a hame-crease and wooden hame fixed thereto.

In order that the advantages and peculiar construction of my improved collar and hame may be clearly understood, and others enabled to correctly make the same, I will now proceed to describe it in connection with the accompanying drawings, in which—

Figure 1:
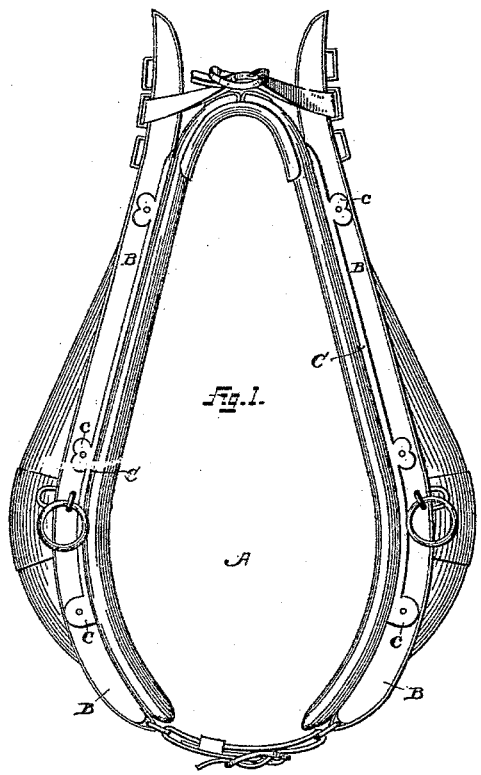
Figure 2:
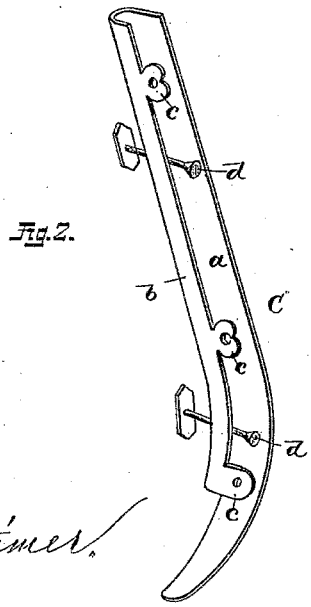

Figure 1 is a front elevation of a completed combined collar and hame, and Fig. 2 is a detail view of a hame crease or shell which is secured to the collar, and which forms a means for retaining the collar in shape, and also furnishing a means of securing the hame to the collar.

In the drawings, A represents the collar, which is made up of two sections. The lower ends of these sections are a short distance apart, in order to leave a space between for the reception of the windpipe of the animal upon which the collar is placed, and in this way all strain is kept from that part of the animal.

B represents the wooden part of the hames, which are provided with the ordinary rings and staples for attachment of the breast-chains and traces, and have the usual adjustable fastening-straps, or their equivalents, at their upper and lower ends, whereby the positions of the parts are regulated, there being a pad or guard at the top, if desired.

C represents a hame crease or shell of any suitable material—such as metal, preferably galvanized iron or rubber—which is of a form to fit within the groove provided for its reception in the collar, between the fore and after wales. This shell is composed of the main oval portion *a* and the lesser curved portion *b*, upon which are the tongues *c*.

In securing the shell and hames to the collar, rivets *d* are passed through the shell and collar, and are secured in place by heading up; or the shell may be bolted upon the collar by screw-bolt. After this has been done the wooden hame is placed in the hollow of the shell, which is of somewhat greater area than is required to receive the same, and the metal composing the shell is bent around, by hammering or otherwise, to fit closely around the hame, and when this has been done the hame is secured in place by passing screws through previously-prepared holes in the tongues c, the opposite side of the shell, and the hame which is contained in the shell.

It will be seen that by my invention any suitable collar can have permanently applied to it a hame attachment, and thus combined collar and hames can be easily produced and in a simple manner, constituting a device which is at once of simple and artistic construction, of artistic appearance, and convenient in putting on and taking off, as well as comfortable in use to the animal. When the shell and hame have been thus secured to the collar, it will be apparent that a completed collar and hame is produced, the shape of which is preserved by the metal shell. Thus two completed sections are connected by the usual stops or any equivalent means placed upon the hame at the top and bottom, and as the ends of the sections are free at top and bottom, it will be clear that the collar may be adjusted to any size of animal.

It will be seen from the foregoing, also, that by my invention I do away with the friction upon the top of the neck of the horse by allowing each section of the collar to play or move with the shoulder against which it bears, and that by reason of the fact that the collar perfectly fits the neck of the animal a sweat-pad may be dispensed with.

Having thus described my invention, what I claim as new, and desire to secure by Letters Patent, is—

1. As an improved article of manufacture, a hame crease or shell, of metal or other suitable hard material, constructed, as described, with curved portion b and tongues c, as and for the purpose set forth.

2. The combination, with a hame crease or shell, of metal or other suitable material, constructed, as described, with the curved portion b and tongues c, of the screw-bolts or rivets d, as set forth.

3. The combination, with a collar, of a hame crease or shell, of metal or other suitable material, constructed as described, and fixed thereto, capable of receiving a hame to be fixed therein, whereby a hame attachment is adapted to be fixed to any suitable collar, substantially as described.

4. The combination, with a horse-collar made in two sections, of the described hame attachment, consisting of the hame crease or shell C and wooden hames fixed therein, substantially as described.

In testimony whereof I affix my signature in presence of two witnesses.

WM. C. AGNEW.

Witnesses:
J. A. McCREA,
CHARLES SMITH.